United States Patent [19]
Oliva-Bonino

[11] 3,951,380
[45] Apr. 20, 1976

[54] DEMOUNTABLE VALVE

[75] Inventor: Lucien Oliva-Bonino, Grenoble, France

[73] Assignee: Gachot S.A., Soisy-Sous-Montmorency, Val d'Oise, France

[22] Filed: Jan. 28, 1974

[21] Appl. No.: 437,027

[30] Foreign Application Priority Data
Mar. 20, 1973 France .................. 73.09897

[52] U.S. Cl. ................ 251/304; 251/312; 251/315; 251/316; 137/454.2; 251/160
[51] Int. Cl.² ................................ F16K 1/22
[58] Field of Search ........ 251/304–308, 309–313, 251/314–317, 366, 367, 158–161, 251/187, 188; 137/454.2

[56] References Cited
UNITED STATES PATENTS

| | | |
|---|---|---|
| 3,191,906 | 6/1965 | Zeigler et al. .......... 251/304 X |
| 3,193,248 | 7/1965 | Lowrey ................ 251/367 X |
| 3,528,448 | 9/1970 | Urban ................. 251/308 X |
| 3,601,360 | 8/1971 | Scaramucci ............. 251/304 |
| 3,601,364 | 8/1971 | Scaramucci ............. 251/306 |
| 3,635,439 | 1/1972 | McVally ................ 251/315 |

Primary Examiner—Charles J. Myhre
Assistant Examiner—Ira S. Lazarus
Attorney, Agent, or Firm—Young & Thompson

[57] ABSTRACT

The valve has a hollow body provided with two ports for the circulation of a fluid and fitted with a plug having an operating stem which is integral with the plug and emerges from an opening of the valve body. At least one oblique recess is provided between the opening and one of the ports in order to facilitate the positioning of the valve-operating stem.

10 Claims, 7 Drawing Figures

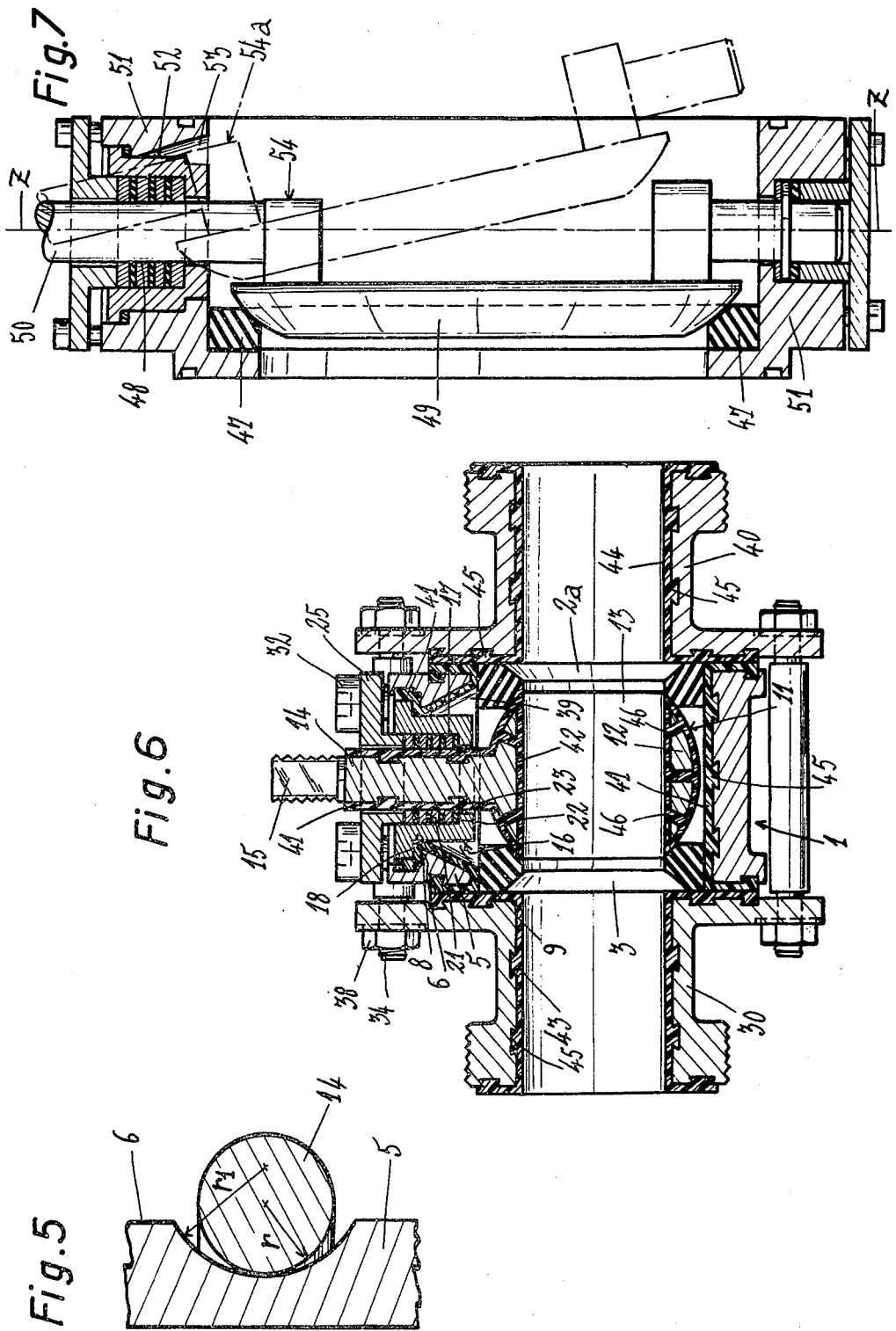

DEMOUNTABLE VALVE

The present invention relates to a demountable valve or any like pipe-closing device such as a cock or gate-valve, the term "valve" being used in a general sense in the following description to designate any apparatus which serves to control the circulation of a liquid or gaseous fluid within a pipe.

The valve contemplated by the invention comprises in a general manner a hollow body pierced by two openings or ports connected to the ends of two sections of a pipe through which a fluid circulates, and a closure member or plug housed within the valve body and actuated by means of a stem which passes through a lateral opening of the valve body.

The present invention applies preferentially to valves of the type in which the closure member consists of a spherical ball or plug which is pierced by a diametrical passage and is capable of rotating about an axis at right angles to that of the passage. However, the invention can also apply to cocks and valves of both the cylindrical plug type and the disc type.

In spherical-plug valves, the plug and operating stem are usually constituted by two separate components which must be assembled at the time of fitting of the valve. To this end the plug is provided with a slot, one end of the valve-operating stem which is chamfered in much the same manner as a screwdriver being inserted in said slot. Leak-tightness between the valve body and the operating stem is obtained by means of a flexible packing, said packing being compressed within its housing or so-called "lantern" which is rigidly fixed to the valve body by means of a component which is added to this latter and known as a packing-gland. The disadvantage of this valve, however, lies in the fact that at the end of a certain time of operation, the end of the valve stem becomes blunt and no longer displaces the valve plug in rotational motion, with the result that the stem has to be replaced. Moreover, a valve of this type cannot be employed in contact with corrosive fluids without entailing substantial modifications. In point of fact, it is not sufficient to provide parts which are exposed to corrosive fluids with a covering of chemically resistant plastic material since creep deformation of this material would take place at the chamfered end of the operating stem as soon as the valve is used; provision must therefore be made between the stem and the plug for a metal component which has good mechanical and chemical strength such as tantalum, thereby substantially increasing the cost price of the complete unit.

There is another known type of valve in which the operating stem is made integral with the valve plug, the top opening of the valve body being of sufficient size to permit the plug to pass through at the time of assembly. In order to close the opening which has just been mentioned, there is placed between the valve body and the operating stem a component known as a "bonnet" which has a housing or so-called lantern for the flexible packing and cooperates with the packing-fluid so as to ensure leak-tightness around the valve-operating stem. It is therefore necessary to perform a double clamping operation, namely which consists in clamping the gland against the bonnet and in clamping the bonnet against the valve body, thus complicating the assembly and inspection of the valve.

Furthermore, the dimensions of the top opening make it more difficult to guide the valve plug in its movement of rotation. This guiding action is obtained by means of two annular bearing faces which are placed on each side of the valve plug around the ports formed in the valve body and the ends of which are located in two inclined planes with respect to each other. It is found in practice that these bearing faces wear rapidly and especially in an uneven manner, thus entailing the need for frequent re-tightening in order to maintain a good standard of leak-tightness around the valve plug.

The aim of this invention is to overcome the disadvantages which have just been mentioned in the foregoing.

In accordance with the invention, the valve comprising a hollow body provided with two ports for the circulation of a fluid and fitted with a plug having an operating stem which is integral with said plug and emerges from an opening of the valve body is characterized in that said body has at least one oblique recess for positioning the valve-operating stem, said recess being formed between said opening and one of the ports of the valve body.

By making provision within the valve body simply for an oblique recess between the lateral opening and one of the ports, it is possible to introduce through said port a valve plug and operating stem which is integral with said plug while making it possible to limit the dimensions of the opening; leak-tightness between the valve plug and its bearing faces can thus be maintained over a long period without any need for re-tightening and the overall size of the valve is appreciably reduced.

If it is also necessary in this valve to add a lantern to the body in order to close-off the space formed between the operating stem and the lateral opening, it is possible in accordance with a preferred embodiment of the invention to provide means for simultaneously clamping the packing within its housing and the lantern against the valve body.

The means aforesaid comprise a gland which is applied against the packing and screws which are applied against the gland and are screwed directly into the valve body. By tightening said screws, the desired leak-tightness is obtained both between the valve stem and the lantern and between the lantern and the valve body; this has the effect of removing the chief disadvantage which arises from the use of a lantern added to the valve body.

In an advantageous embodiment of the invention, provision is made between on the one hand the valve-operating stem and on the other hand the lantern and the packing-gland for clearance spaces which permit slight inclination of the stem with respect to the lateral opening. By virtue of this arrangement, the valve plug is applied automatically against its seats even when these latter become worn, thus making it possible to allow longer intervals between the moments when re-tightening proves necessary.

Moreover, the valve in accordance with the invention is well adapted to receive a corrosion-resistant lining of polyfluorinated plastic material such as tetrafluoroethylene as and when the need arises. In this particular embodiment, the lining constitutes a joint plane, both between the valve body and the lantern and between said body and the added coupling flanges which are adjacent to the two valve ports.

Further properties of the invention will be brought out in the description which now follows, three particular embodiments of the invention being shown in the accompanying drawings which are given by way of example without any limitation being implied, and in which:

FIG. 5 is a detail sectional view to a larger scale showing the valve-operating stem and the adjacent portion of the valve body whilst the valve plug fitted with its stem is being introduced into the body along line V—V of FIG. 2;

FIG. 6 is a vertical sectional view which is similar to FIG. 4 and shows a second embodiment of the invention in the case of a valve which has been completely lined with corrosion-resistant material;

FIG. 7 is a fragmentary vertical sectional view which is similar to FIG. 4 and shows a third embodiment in the case of a disc valve.

Figure 1:
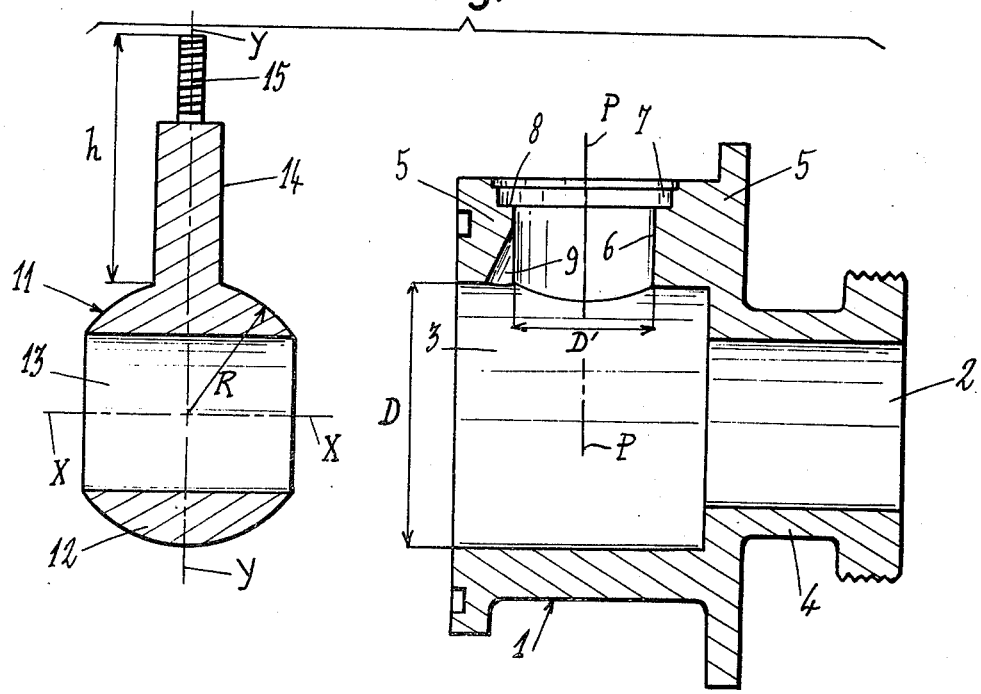
FIG. 1 is an exploded view in vertical section taken along line II of FIG. 3 and showing a valve body and a corresponding valve plug which is fitted with its operating stem and is assumed to have been removed from the body.
Figure 2:
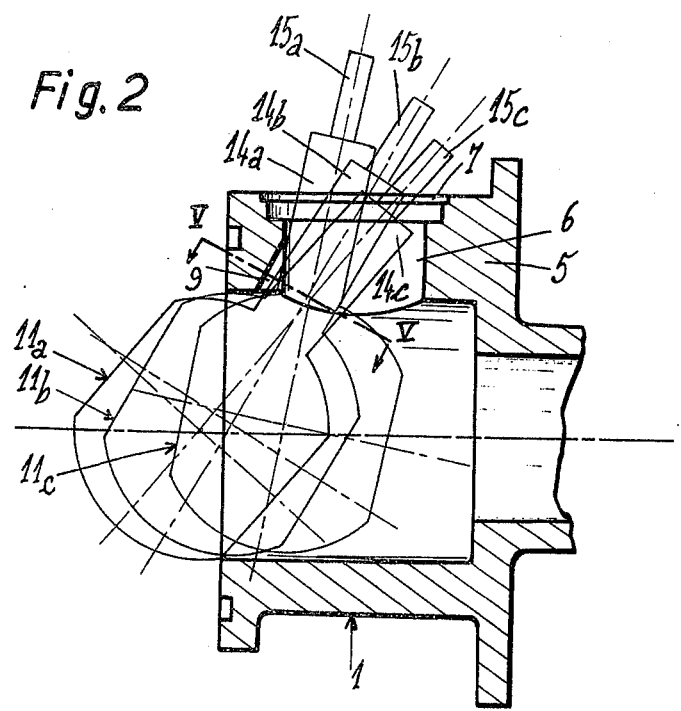
FIG. 2 is a sectional view which is similar to FIG. 1 and is a schematic representation of the different stages of introduction of the valve plug fitted with its operating stem into the valve body.

In the first embodiment of the invention which is contemplated in FIGS. 1 to 5 of the accompanying drawings, the valve is provided as shown on the right-hand side of FIG. 1 with a hollow body 1 having two circular ports 2 and 3 for the circulation of a fluid, said ports being in substantially coaxial relation. The port 2 is located at the extremity of a narrowed portion 4 of the valve body 1, said narrowed portion being intended to be connected to a first fluid circulation pipe with interposition of an O-ring seal (not shown in the drawings). The port 3 is intended to be fitted around its periphery with a coupling flange 30 (shown in FIG. 4) with interposition of an O-ring seal 33, said flange being in turn connected to a second fluid circulation pipe. The valve body 1 further comprises a barrel 5 which is disposed laterally with respect to the axes of the ports 2 and 3, there being formed within said barrel a cylindrical bearing surface 6 which communicates with the interior of the hollow body 1 and terminates externally in a circular opening 7, the diameter of which is larger than that of the cylindrical surface 6 so as to constitute an annular bearing face 8.

A recess 9 which is disposed obliquely with respect to the axis P—P of the opening 7 is formed in that zone of the cylindrical surface 6 which is located nearest the port 3. As is apparent from FIG. 5, said recess 9 has a cylindrical wall and the radius $r_1$ of the transverese cross-section of said cylindrical wall is slightly larger than the radius $r$ of the valve-operating stem to which further reference will be made in the following description. As can be seen from FIG. 1, the depth of the recess 9 is of maximum value at that end of the cylindrical surface 6 which is remote from the opening 7 and decreases to zero at the end nearest said opening 7.

On the left-hand side of FIG. 1, there is shown a one-piece unit 11 comprising a valve plug 12 having a spherical contour of radius R pierced by an axial passage 13 and a valve-operating stem, the axis Y—Y of which is perpendicular to the axis X—X of the passage 13. Said valve-operating stem in turn has a smooth portion 14 of radius $r$ which is adjacent to the valve plug followed by a threaded portion 15 on which are machined two flat surfaces for displacing the operating stem in rotational motion by means of a hand-wheel (not shown in the drawings).

The diameter D of the port 3, the diameter D' of the cylindrical bearing surface 6, the radius R of the valve plug 12, the radius $r$ of the smooth portion 14 of the operating stem and the total height $h$ of said stem are intended to permit the introduction of the one-piece unit 11 into the valve body 1 although 2 R is greater than D'. As shown diagrammatically in FIG. 2 in which the one-piece unit 11 is shown in three successive positions in superimposed relation (11a, 11b, 11c), the operating stem 14 is first inclined so as to enable this latter to pass through the port 3; the stem is then moved towards the vertical position by bringing this latter into contact with the recess 9, with the result that said stem is permitted to emerge from the opening 7 and the valve plug 12 is permitted to engage completely within the hollow central portion of the valve body 1. The means employed for securing the one-piece unit in its operating position will now be described.

Figure 4:
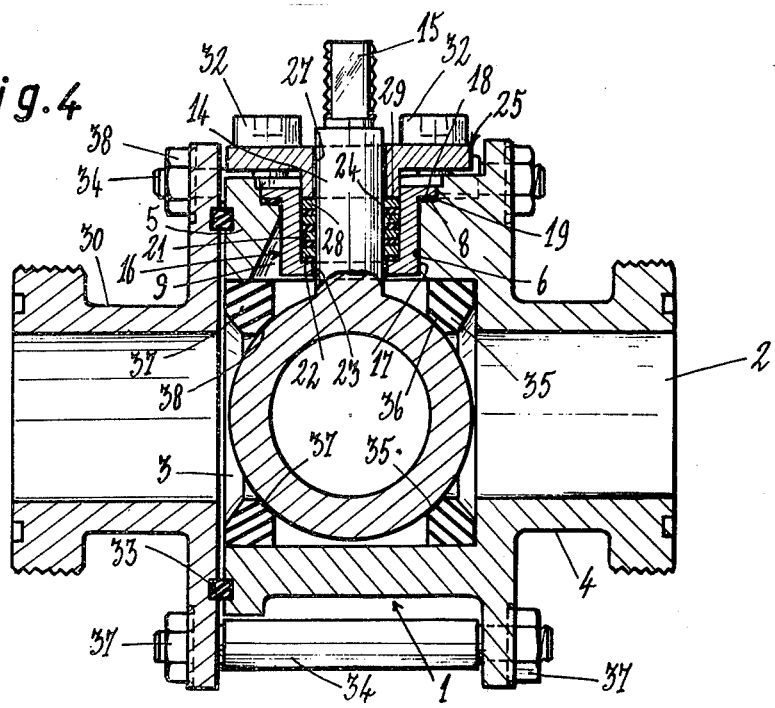
FIG. 4 is a vertical sectional view which is similar to FIG. 1 and shows the same valve which has been completely assembled.

As shown in FIG. 4, the space which is permitted to remain between the barrel 5 and the smooth portion 14 of the operating stem is occupied by a packing-box. Said box comprises in the first place a sleeve known as a lantern 16 provided with an external cylindrical portion 17 which engages within the cylindrical bearing surface 6 of the barrel 5, followed by an annular flange 18 which is applied against the face 8 of the valve body with interposition of a seal 19. The lantern 16 is provided with an internal housing 21 and this latter is limited at the end nearest the valve plug by an annular abutment shoulder 22 within which is formed a bore 23.

Figure 3:
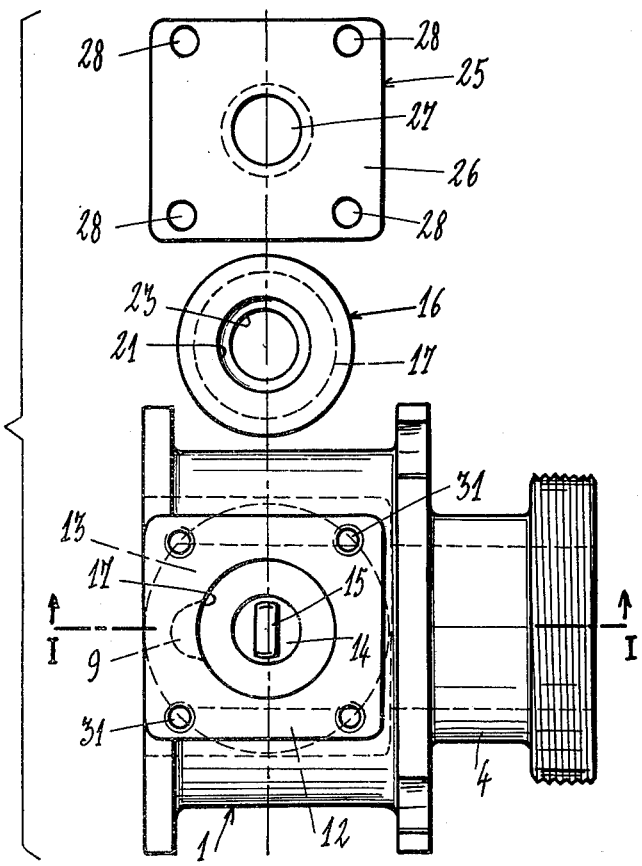
FIG. 3 is an exploded plan view from above and showing the body of the same valve after introduction of the valve plug but prior to positioning of the lantern and packing-gland.

The housing 21 is filled with a sealing packing 24 of braid or a similar substance which is double and which can be compressed by means of a packing-gland 25. As shown in FIG. 3, said gland comprises a square portion 26 pierced by a central opening 27 and four smooth-walled holes 28 which are adjacent to each of the vertices of the square. This portion is followed on the side which is directed towards the valve by an annular flange 29 which is capable of engaging within the housing 21 of the lantern 16. The top face of the barrel 5 is provided with four internally-threaded holes 31 which are disposed in the same manner as the holes 28 of the packing-gland 25. The gland 25 is fixed on the barrel 5 by means of screws 32 which traverse the holes 28 and are screwed into the holes 31; the lantern 16 is thus maintained in position between the gland 25 and the barrel 5, the screws 32 being intended to project to the exterior of said lantern. Substantial clearances are provided between on the one hand the operating stem 14 and on the other hand the internal surface 27 of the gland 25 and the bore 23 of the lantern 16.

The unit described in the foregoing can be assembled with ease: the lantern 16, the packing 24 and the gland 25 are engaged around the operating stem 14 which projects from the opening 7. The lantern 16 is placed in position within the cylindrical bearing surface 6 of the barrel 5 and the annular flange 29 of the gland 25 penetrates within the lantern 16 and is applied against the packing 24. The complete assembly is fixed in position by means of the screws 32.

The coupling flange 30 is clamped in known manner against that face of the valve body 1 in which the port 3 is formed, after interposition of the O-ring seal 33 which is fitted within grooves provided for this purpose, the clamping action being produced by means of tie-rods 34 which are each threaded at both ends and passed through smooth-walled bores formed on one side in the coupling flange 30 and on the other side in the valve body 1.

In order to ensure a connection between the valve plug 12 and the valve body 1, a first annular seat 35 of plastic material, for example, is introduced into the body prior to positioning of the valve plug. One face of the valve seat 35 is applied against the narrowed portion 4 of the valve body and the opposite face has a spherical bearing surface 36 for the plug 12. A second annular valve seat 37 which is similar to the first is fitted within the body 1 at the edge of the port 3 prior to assembly of the coupling flange 30. One face of the valve seat 37 is applied against the flange 30, the opposite face being provided with a spherical bearing surface 38 for the valve plug 12. Provision is made for a very small clearance between on the one hand the valve plug 12 and on the other hand the bearing surfaces 36, 38.

The operation involved in asembling the unit which has been described in the foregoing does not present any difficulty.

As is readily apparent, the design structure of the unit is such that, by tightening the screws 32, the gland 25 is moved towards the lantern 16, thereby compressing the packing 24 within its housing while at the same time flattening the seal 19 by compression between the annular flange 18 of the lantern and the face 8 of the valve body. It is therefore possible by means of a single operation to suppress any leakage of fluid along the valve-operating stem 14 as well as any leakage around the periphery of the lantern 16.

Moreover, the integral unit-construction of the valve-plug and stem assembly 11 (as obtained by machining or casting) circumvents all the difficulties mentioned earlier in connection with control of the valve.

As a result of the clearances provided on the one hand along the operating stem 14 on each side of the packing 24 and on the other hand between the valve plug 12 and the behring surfaces 36 and 38, the one-piece unit 11 is permitted to deviate from its mean position between said bearing surfaces by a few tenths of a degree. If a substantial pressure difference occurs in the closed position of the valve between the pipe sections which are connected respectively to the two valve ports, the plug 12 is powerfully applied against one of the seats 35 or 37 which is slightly flattened under this action without causing the operating stem 14 to come into contact either with the lantern 16 or with the gland 25.

In accordance with an alternative form of the of first embodiment of the invention which is illustrated in FIG. 6, the cylindrical bearing surface 6 is provided with a second recess 39 which is diametrically opposite to the recess 9 and similar to this latter. In addition, the narrowed portion 4 o the body 1 is replaced by a second coupling flange 40 which is similar to the flange 30. The one-piece unit 11 can thus be introduced into the valve body 1 in the desired manner. either through the port 2a opposite to the flange 40 or through the port 3 opposite to the flange 30, with the result that the ease of assembly of the valve in accordance with the invention is even further enhanced.

In addition, in this alternative embodiment, the surfaces which are liable to be attacked when a corrosive fluid circulates within the pipe are lined with a layer of plastic material which affords resistance to the corrosive action of circulating fluids such as a fluorocarbon resin. In FIG. 6, said lining is shown at 41 in the case of the vaove body and at 42 in the case of the one-piece unit 11, at 43 in the case of the coupling flange 30 and at 44 in the case of the coupling flange 40. Said lining is preferably formed of material such as polytetrafluoroethylene which is capable of undergoing deformation under the action of pressure. When two surfaces, at least one of which is lined with material of this type, are applied against each other under a given pressure, said surfaces form a leak-tight joint plane which makes it unnecessary to provide separate seals. Thus the portion of the lining 41 which covers the bearing surface 8 of the valve body which in turn cooperates with the annular flange 18 of the lantern constitutes a joint plane between these two components, thereby dispensing with any need for the seal 19. Moreover, the lining 43 projects from those faces of the valve body 1 in which the ports 2a and 3 have their openings and constitutes a joint plane between the valve body and the adjacent portions of the coupling flanges 30 and 40.

In order to ensure perfect adhesion of the linings 41, 42, 43, 44 to the elements which they are intended to protect, said linings are provided with dovetailed anchoring grooves 45 which are filled by the plastic material at the time of application. So far as the valve plug 12 is concerned, said grooves are replaced by secondary passages 46 which are formed between the external spherical surface and the axial passage 13 and which are filled with plastic material so as to enable the lining 42 to withstand the friction forces to which it is subjected when the valve plug is caused to rotate under a heavy load.

It will clearly be understood that there is not necessarily any relation between the two distinctive features of the alternative embodiment which has just been described, namely on the one hand the presence of two recesses 9 and 39 in the cylindrical bearing surface 6 and of two coupling flanges 30 and 40 opposite to the valve ports and, on the other hand, the presence of a lining 41–44 which has a protective function and also contributes to the leak-tightness of the valve.

In a third embodiment of the invention which is illustrated in FIG. 7, the spherical plug valve is replaced by a disc 49. In accordance with the known technique in the field of improved butterfly valves, especially as disclosed in the French Pat. No. 2,038,438 filed by the present Applicant, said disc 49 is displaced with respect to the axis Z—Z of the valve-operating stem 50. The edge of said disc has a spherical shape and is applied in the closed position of the valve against an annular seat 47 of plastic material, the internal surface of which corresponds in shape to the edge of the disc 49. Said disc and the operating stem 50 again form a one-piece unit 54 in this embodiment. The valve body 51 is provided with a lateral cylindrical opening 52 through which the operating stem 50 passes; this opening is provided on the side remote from the valve seat 47 with respect to the axis Z—Z with an oblique recess 53 fo the introduction of the one-piece unit 54.

This introduction is carried out in the manner described earlier in connection with the first embodiment of the invention by causing the operating stem to pivot in the bottom portion of the recess 53 as shown by the chain-dotted lines in FIG. 7 which represent a characteristic position 54a taken up by the one-piece unit during the introduction of this latter.

It is readily apparent that those surfaces which are exposed to corrosive fluids can be protected by a lining which is similar to that described in the foregoing.

I claim:

1. A valve comprising a hollow body having two oppositely disposed flow ports, a plug rotatable in said hollow body for controlling the flow of fluid between said ports, a substantially cylindrical operating stem integral with said plug, said stem emerging from an opening of said valve body having a central axis and protruding beyond said valve body, said body having at least one oblique recess therein for receiving the valve operating stem thereby to permit insertion of said plug and stem, as a one-piece assembly, into said body and removal of said plug and stem as a one-piece assembly from said body through one of said ports having a central axis, said recess being disposed between said opening and said one port, said oblique recess having a wall that is part of the surface of a cylinder whose radius is slightly greater than the radius of said cylindrical operating stem, the axis of said surface intersecting said axes of said opening and said one port at acute angles.

2. A valve according to claim 1 in which the valve body comprises a barrel having a terminal opening from which the valve-operating stem emerges, wherein said barrel is provided with an internal cylindrical bearing surface for a packing-seal lantern which ensures centering of the valve-operating stem after interposition of a flexible packing.

3. A valve according to claim 2, said barrel having an internal bearing face, said lantern having an outwardly extending annular flange opposite said bearing face, said lantern having an internally extending annular flange at the end of the lantern located nearest the valve plug, and a packing seal within the lantern.

4. A valve according to claim 3, wherein said valve comprises means for simultaneously clamping the packing within its housing and clamping the lantern against the bearing face of the barrel.

5. A valve according to claim 4, wherein the clamping means comprise a gland applied against the packing by means of an annular flange at the end remote from the abutment shoulder and screws in parallel relation to the axis of the barrel which are applied against said gland and are screwed into said barrel.

6. A valve according to claim 3, wherein the valve plug, the operating stem and the internal walls of the valve body are provided with a lining of plastic material which affords resistance to the corrosive action of circulating fluids, said lining extending over those surfaces of the valve body which are adjacent to the lantern.

7. A valve according to claim 6, wherein the lining of plastic material constitutes a joint plane between the valve body and the lantern.

8. A valve according to claim 6 in which the valve body has added coupling flanges, wherein the lining of plastic material projects with respect to that face of the valve body in which each valve port has its opening, said face being such as to constitute a joint plane between said valve body and the adjacent coupling flange.

9. A valve according to claim 2, the barrel having a central axis, there being clearance between the valve-operating stem and the lantern to enable said stem to take up a slightly inclined position with respect to the axis of the barrel.

10. A valve according to claim 1, wherein the valve plug, the operating stem and the internal walls of the valve body have a lining of plastic material which affords resistance to the corrosive action of circulating fluids.

* * * * *